United States Patent
Krueger

(10) Patent No.: US 9,335,988 B2
(45) Date of Patent: *May 10, 2016

(54) MANAGING BUILD VARIANTS IN A COMMON REPOSITORY

(71) Applicant: SAP SE, Walldorf OT (DE)

(72) Inventor: Uwe Krueger, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/581,454

(22) Filed: Dec. 23, 2014

(65) Prior Publication Data

US 2015/0113505 A1    Apr. 23, 2015

Related U.S. Application Data

(63) Continuation of application No. 13/690,368, filed on Nov. 30, 2012, now Pat. No. 8,954,938.

(51) Int. Cl.

| G06F 9/44 | (2006.01) |
|---|---|
| G06F 7/00 | (2006.01) |
| G06F 17/30 | (2006.01) |
| G06F 9/45 | (2006.01) |
| G06F 11/34 | (2006.01) |
| G06F 11/36 | (2006.01) |

(52) U.S. Cl.
CPC .. G06F 8/70 (2013.01); G06F 8/41 (2013.01); G06F 8/71 (2013.01); *G06F 11/3476* (2013.01); *G06F 11/3604* (2013.01)

(58) Field of Classification Search
CPC .............. G06F 8/65; G06F 8/68; G06F 8/71; G06F 9/44; G06F 17/30312; G06F 11/368; G06F 11/3624; G06F 11/3476; G06F 11/3604; G06F 8/41; G06F 8/70; G06F 8/36
See application file for complete search history.

(56) References Cited

U.S. PATENT DOCUMENTS

| 5,574,898 A * | 11/1996 | Leblang | ............... G06F 11/3476 |
| 5,649,200 A * | 7/1997 | Leblang | .................... G06F 8/71 |
| | | | 707/999.202 |

(Continued)

OTHER PUBLICATIONS

Michael Fischer et al., Populating a Release History Database from Version Control and Bug Tracking Systems, 2003 IEEE, [Retrieved on Mar. 22, 2016]. Retrieved from the internet: <URL: http://ieeexplore.ieee.org/stamp.jsp?tp=&arnumber=1235403> 10 Pages (1-10).*

(Continued)

*Primary Examiner* — Thuy Dao
*Assistant Examiner* — Anibal Rivera
(74) *Attorney, Agent, or Firm* — Buckley, Maschoff & Talwalkar LLC

(57) ABSTRACT

A system includes determination of first coordinates in a repository coordinate system associated with a seed component corresponding to a target build result of a first code building system, the seed component comprising a projection method between the repository coordinate system and a variant coordinate system of the first code building system, determination of second coordinates in the variant coordinate system, the second coordinates associated with an execution environment of the target build result, determination of third coordinates in the repository coordinate system based on the first coordinates, the second coordinates and the projection method, and association of the target build result with the third coordinates.

15 Claims, 9 Drawing Sheets

(56) References Cited

U.S. PATENT DOCUMENTS

| | | | | |
|---|---|---|---|---|
| 7,788,238 | B2* | 8/2010 | Gabriel | G06F 8/71 707/695 |
| 8,522,207 | B1* | 8/2013 | Whittington | G06F 8/71 707/999.203 |
| 2004/0194060 | A1* | 9/2004 | Ousterhout | G06F 8/41 717/120 |
| 2005/0015762 | A1* | 1/2005 | Steckler | G06F 8/71 717/176 |
| 2010/0262948 | A1* | 10/2010 | Melski | G06F 8/71 717/101 |
| 2011/0276945 | A1* | 11/2011 | Chasman | G06F 11/3604 717/124 |
| 2011/0302217 | A1* | 12/2011 | Heidasch | G06Q 30/02 707/802 |
| 2013/0174117 | A1* | 7/2013 | Watters | G06F 8/71 717/106 |
| 2013/0174122 | A1* | 7/2013 | Watters | G06F 8/36 717/121 |
| 2013/0174124 | A1* | 7/2013 | Watters | G06F 8/71 717/122 |
| 2013/0326479 | A1* | 12/2013 | Russell | G06F 8/70 717/121 |

OTHER PUBLICATIONS

Ian Foster, Globus Toolkit Version 4: Software for Service-Oriented Systems, Jul. 2006, [Retrieved on Mar. 22, 2016]. Retrieved from the internet: <URL: http://download.springer.com/static/pdf> 8 Pages (513-520).*

* cited by examiner

MANAGING BUILD VARIANTS IN A COMMON REPOSITORY

BACKGROUND

Code building systems produce build results based on a source component. A source component may include a set of related source code files, and a build result may include general binary content such as executables or compressed archives. Some code building systems may produce two or more build results (i.e., variants) based on a single source component. Each variant may be intended for use in a different execution environment or build mode.

Build results produced by a code building system may be stored in a repository dedicated to the code building system. This storage facilitates the build execution of a dedicated source component by allowing for the use of build results from the execution of builds of other source components. For example, a build execution to build an application component may require build results from a build execution of a library component, which was executed separately (i.e., temporally decoupled) from the application build. To distinguish the various build results produced by a code building system, the build system and those repositories that are specific to the build system support a build result naming scheme. Consequently, a name or address of a required build result is used to locate the build result in the repository. The name or address is treated as a set of coordinates in a coordinate system used by the repository and determined by the naming scheme.

DETAILED DESCRIPTION

The following description is provided to enable any person in the art to make and use the described embodiments. Various modifications, however, will remain readily apparent to those in the art.

Figure 1:
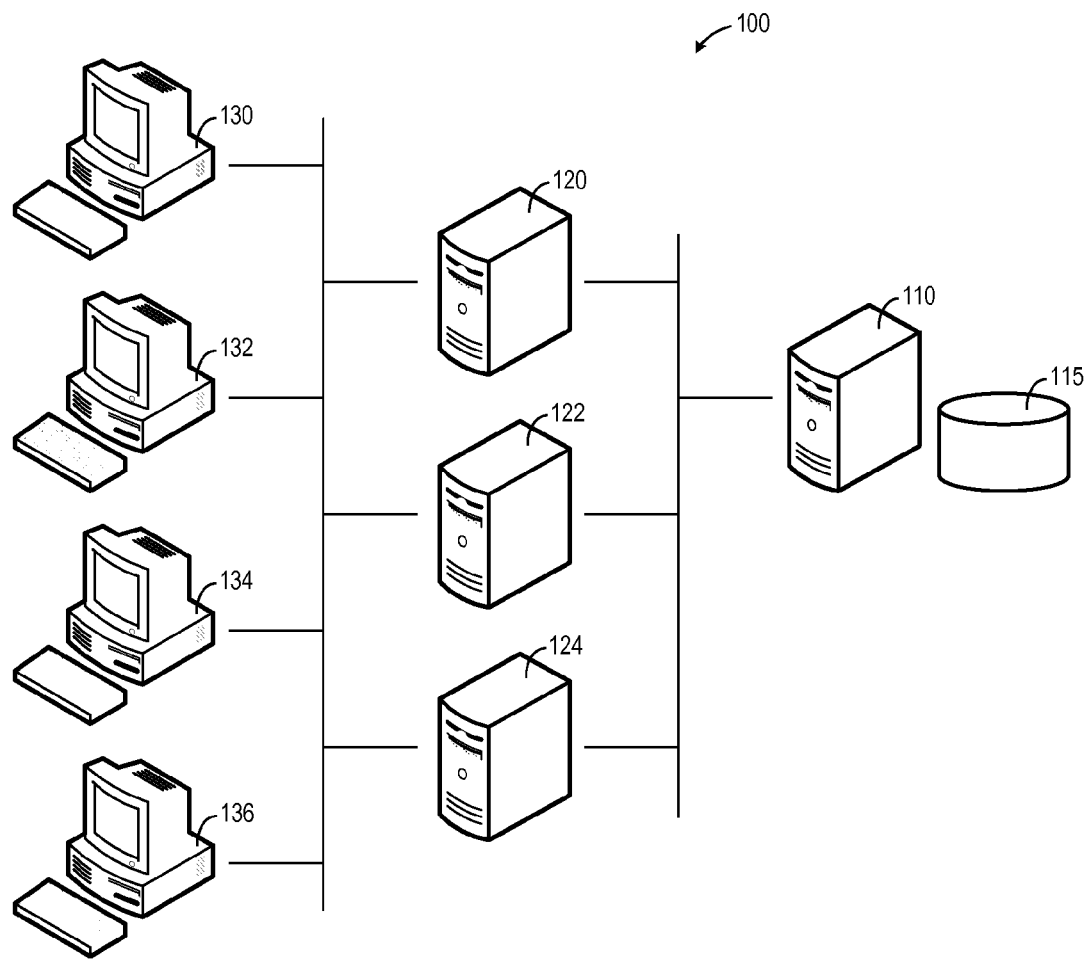
FIG. 1 is a block diagram of a computing architecture according to some embodiments.

FIG. 1 is a block diagram of computing architecture 100. Architecture 100 includes client computing systems 130-136, code building systems 120-124, repository management system 110 and repository 115. Any of the depicted elements of architecture 100 may be implemented by one or more hardware devices coupled via any number of public and/or private networks. Two or more of such devices may be located remote from one another all devices may communicate with one another via any known manner of network(s) and/or via a dedicated connection. Generally, physical implementations of computing architecture 100 are not limited by the FIG. 1 depictions.

Client systems 130-136 may comprise any of a desktop computer, a laptop computer, a netbook computer, a tablet computer, a smartphone, and/or any other computing system that is or becomes known. Each of code building systems 120-124 provides code-building functions (e.g., compiling, linking, etc.) to client systems 130-136.

According to some embodiments, any of client systems 130-136 may instruct any of code building systems 120-124 to generate binary build results based on a source component. The source component may include a set of related source code files, and a binary build result may consist of a library, a header file and an executable application, generated by compiling the source code files. Such instructions may include build mode parameters and/or platform parameters. Build mode parameters specify how the build is to be performed, e.g., "apply code optimization", "don't apply code optimization", "include debug information", and "strip debug information". Platform parameters specify the intended execution environment of the final software, e.g., Compiler, Compiler version, Linker, Linker version, Operating system, Operating System version, and Bit depths. Build results intended for one execution environment may not be able to be used on another platform. In contrast, build results generated based on different build mode parameters are sometimes combinable for execution in a common environment. Generation of build results may include code generation steps or general transformation steps which receive input data, execute some transformations, and produce output data different from the input data.

A code building system may express the foregoing parameters as dimensions (i.e., axes) of a variant coordinate system. Each dimension is associated with two or more possible values. For example, a code building system may define a platform parameter dimension having possible values 'WinNT-x64', 'WinNT-x32' and 'linux-x64', and a build mode parameter dimension having possible values 'debug', 'release' and 'debugrelease', respectively specifying builds with debug information, optimized release builds without debug information, and optimized release builds with debug information.

A code building system may generate a first build result based on a particular source component and on one dedicated value per dimension, and may generate a second build result based on the same particular source component and on a different set of dimension values. The first and second build results are considered build variants of one another, and each build variant is associated with coordinates of the code building system's variant coordinate system.

As will be described in more detail below, each of code building systems 120-124 may use a different variant coordinate system to define build variants and to distinguish build results for different variants. A build result repository provided by such a build system, which is used to provide build result variants for the build of other source components, features an addressing space able to express the variant coordinates and allowing various build result variants to be distinguished from one another. The different variant coordinate systems may include different dimensions and/or dimension values. Each of code building systems 120-124 provides an addressing space that allows a build step to refer to already-available build results based on dimension values. For example, a variant coordinate system may include an axis for each of two or more dimensions. Accordingly, a build result may be associated with a coordinate consisting of a dimension value for each of the two or more dimensions.

Repository management system 110 and repository 115 may be used to store build results generated by systems 120-

124 and to provide those build results to systems 120-124 upon request. Repository management system 110 and repository 115 provide a dedicated coordinate system (i.e., the repository coordinate system) that can be used to identify build results. The repository coordinate system may differ from any of the variant coordinate systems used by systems 120-124.

Figure 2:
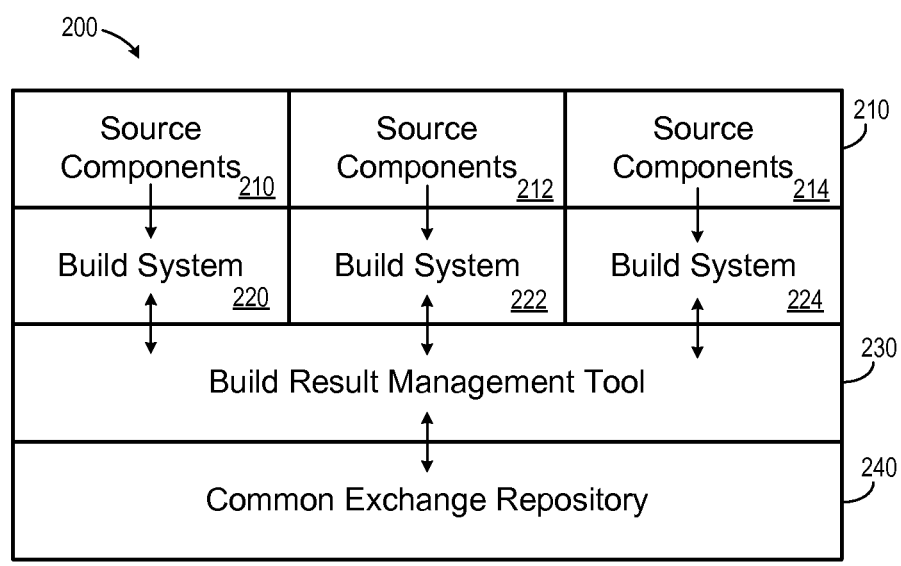
FIG. 2 illustrates a logical architecture according to some embodiments.

FIG. 2 illustrates logical architecture 200 according to some embodiments. Logical architecture 200 may be implemented by architecture 100 according to some embodiments.

Source components 210-214 represent sets of related source code files that are to be built together by corresponding build systems 220-224. For example, source components 210 may be provided to build system 220 via one or more client systems such as clients systems 130-136. Build systems 220-224 may be implemented by code building systems such as, but not limited to, systems 120-124.

As described above, any of build systems 220-224 may generate build results and may require previously-generated build results in order to generate build results. Accordingly, each of build systems 220-224 may store build results in and receive build results from common exchange repository 240. Notably, each of build systems 220-224 may utilize a different variant coordinate system, which is mapped to the coordinate system of repository 240.

Build result management tool 230 facilitates storage of build results produced by build systems 220-224 into common exchange repository 240, regardless of differences in their variant coordinate systems. Similarly, build result management tool 230 facilitates retrieval of build results from common exchange repository 240 by build systems 220-224, regardless of differences in their variant coordinate systems. Generally, build result management tool 230 may facilitate storage of a build result generated by a first code building system having a first variant coordinate system in common exchange repository 240, and retrieval of that build result by a second code building system having a second variant coordinate system.

Operation of build result management tool 230 according to some embodiments will be described in detail below with respect to FIGS. 4 through 7.

Figure 3:
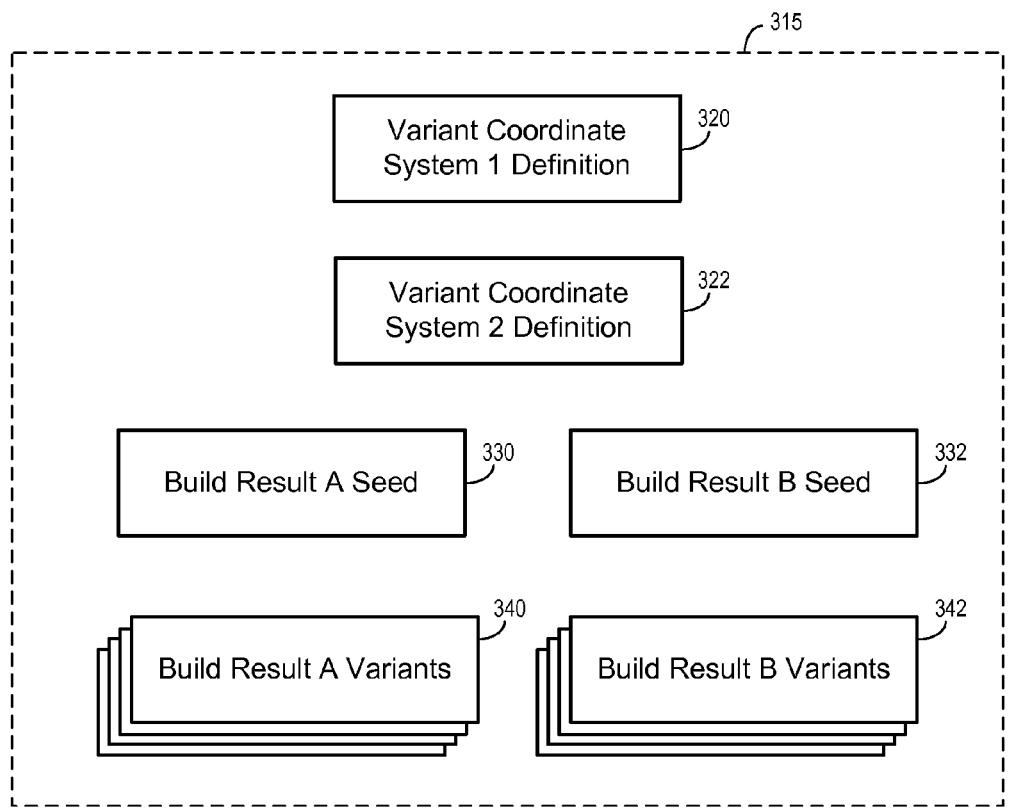
FIG. 3 illustrates files stored in a common repository according to some embodiments.

FIG. 3 illustrates elements stored within common exchange repository 315 according to some embodiments. Definitions 320 and 322 are stored in repository 315 using an ID or coordinates of the repository coordinate system. Definitions 320 and 322 are therefore stored as any other consumable artifact inside repository 315.

Variant coordinate system definitions 320 and 322 describe variant dimensions and possible values per dimension used by a build system to build different variants of a source component. Definitions 320 and 322 may also describe, for the dimensions and values, fallbacks, generalizations and compatibilities. Fallbacks are variants that might be used instead of a requested variant, if no build result is available for the requested variant. For example, an optimized compilation version can be used instead of a debug version, if no debug version is available. Fallbacks feature a dedicated order. A generalization is a virtual variant that is not associated with a dedicated build result but describes a named class of compatible build results which may replace each other. For example, compiler version GCC4 might be a named generalization of real variants GCC4.1 and GCC4.2. There is no GCC4 build result, but it is possible to request such a build result by resolving it either to a GCC4.1 or GCC4.2 version. Compatibilities describe unlabeled sets of build result variants that might replace each other. The dimensions of each coordinate system are orthogonal to each other but not necessarily to dimensions used in another variant coordinate system. The following is an XML example of a coordinate system definition according to some embodiments.

```
<coordinateSystem>
    <dimensions>
        <dimension name="<dim1>">
            <value name="v1"/>
            <value name="v2"/>
            <value name="gcc4.1"/>
            <value name="gcc4.2"/>
            <valueEquivalence name="gcc4">
                <valueRef name="gcc4.1"/>
                <valueRef name="gcc4.2"/>
            </valueEquivalence>
            <ifNoMatch>
                <preferredVariation dimension="<dim2>"/>
            </ifNoMatch>
        </dimension>
        <dimension name="<dim2>">
            <value name="debug">
                <fallbackSequence>
                    <fallback name="releasedebug"/>
                    <fallback value="release" />
                </fallbackSequence>
            </value>
            <value name="releasedebug">
                <fallbackSequence>
                    <fallback name="release"/>
                </fallbackSequence>
            </value>
            <value name="release"/>
        </dimension>
    </dimensions>
</coordinateSystem>
```

If a build system changes its variant coordinate system by adding dimensions or changing the values of dedicated dimensions, a new version for this variant coordinate system is created in the repository. Another specification of a variant coordinate system is as follows:

```
<coordinate-system name="mybuildenv">
    </dimensions>
        <dimension name="platform">
            <value name="linux_x64"/>
            <value name="winnt_x64"/>
            <value name="winnt_x32"/>
        </dimension>
        <dimension name="buildmode">
            <value name="debug"/>
            <value name="release"/>
            <value name="debugrelease"/>
        </dimension>
    </dimensions>
</coordinate-system>
```

As long as a deployed build result refers to its coordinate system version, versioning provided by repository 315 allows keeping already-deployed component versions in the repository unchanged and valid whenever a change of a dedicated variant coordinate system is required.

A component version requires its own entry in repository 315 which is independent of any particular variant of that component. Build result seeds 330 and 332 therefore correspond to a single result component version having build variants, and define the variant coordinate system used to create the build variants and a projection method between the variant coordinate system and the repository coordinate system. Build result seeds 330 and 332 are abstract components (i.e., without content) which represent the whole set of variants created for different variant coordinates.

The projection method is used, as will be described below, to create a sub-space in the repository coordinate system in which to store the build variants. The repository coordinates of a seed component are used as a seed for the mapping of the variant coordinates, in order to generate different mapping coordinates in the repository coordinate system for different seed component coordinates. The following examples refer to a maven-type repository (i.e., projection method groupid, artifactid, classifier), but embodiments are not limited thereto. Generally, the actual implementation of a projection method may depend on the constraints of the common repository.

Build result seeds 330 and 332 are also used to store general metadata of a component version which are valid for all variants of the component version. Build result seeds 330 and 332 are stored in repository 315 in association with coordinates of the repository coordinate system. The repository coordinates of build result seeds 330 and 332 do not require a mapping because seeds 330 and 332 are variant independent.

The following XML format may be used to declare metadata of a seed component according to some embodiments. The self-descriptiveness of the seed component, as will be described below, allows for the identification of build variants of the associated result component in the mapping space of the repository coordinates.

```
<seedComponent>
  <coordinateSystem>
    <groupId>
      com.sap.prd.commonrepo.artifactvariants.coordinatesystems
    </groupId>
    <artifactId>buildpl</artifactId>
    <version>0.1<version/>
  </coordinateSystem>
  <projectionMethod name="groupid|artifactid|classifier"/>
</seedComponent>
```

The method artifactid maps the build variants according to the following repository filesystem structure (where the .compmetadata contains the component metadata for the abstract component as described above):

```
/com/sap/<group>/
  <artifact id>/
    <version>/
      <artifact id>-<version>.pom
      <artifact id>-<version>.compmetadata
/com/sap/<group>/
  <artifact id>@<variant>/
    <version>/
      <artifact id>@<variant>-<version>+8 -<classifier>+9 .<suffix>
      <artifact id>@<variant>-<version>+8 -<classifier>+9 .<suffix>
```

The method groupid maps the build variants according to the following repository layout:

```
/com/sap/<group>/
  <artifact id>/
    <version>/
      <artifactid>-<version>.pom
      <artifactid>-<version>.compmetadata
/com/sap/<group>/
  <dimension1>/
  ...
    <dimension n>
      <artifact id>/
        <version>/
          <artifactid>-<version>.pom
          <artifactid>-<version>[-<classifier>].<suffix>
```

The method classifier maps the build variants according to the following repository layout:

```
/com/sap/<group>/
  <artifact id>/
    <version>/
      <artifactid>-<version>.pom
      <artifactid>-<version>.compmetadata
      <artifactid>-<version>-<variant1>[@<classifier>].<suffix>
      <artifactid>-<version>-<variant2>[@<classifier>].<suffix>
```

Variants 340 and 342 are stored build results generated by one or more code building systems. In FIG. 3, all of variants 340 correspond to seed 330 and to a single variant coordinate system defined by a coordinate system definition identified in seed 330. As mentioned above, seed 330 also specifies a projection method between the single variant coordinate system and the variant coordinate system of repository 315. A similar relationship exists between variants 342 and seed 332.

Although not pictured in FIG. 3, some embodiments further comprise additional structures stored together with every variant. These structures provide additional information about the build mode and/or execution environment of the build variant. Such structures facilitate mapping of coordinates between build variant coordinate systems.

Due to the above-described contents of a seed component, coordinates of a variant coordinate system and the coordinates of the seed component are enough to represent a build variant of that variant coordinate system in a common repository coordinate system. To facilitate cross-coordinate-system dependency resolution as will be described below, additional information about the used environment for a dedicated build variant may be helpful. The properties for this additional information are defined by the variant coordinate system, so all components and variants of this coordinate system provide the same set of properties.

Definitions of the set of properties may be stored in a variant coordinate system definition component, and may contain all the mandatory and optional properties defined by the variant coordinate system. A property includes a name and an optional description. The name may be used in a build variant's properties artifact to specify a value for this property. The property may be declared as optional. Optional properties may be omitted in the build variant's properties artifact. Non-optional properties are provided by a build system for every generated build variant which is stored in the common repository.

For every property, a set of valid values may be declared together with a description for every valid value. Properties without defined values may be assigned any value. An XML property definition file may follow the following format:

```
<variantpropertiesDefinition>
  <property name="<prop1>">
    <description>description</description>
  </property>
  <property name="<prop2>"
      optional="true">
    <description>description</description>
    <options>
      <option>
        <value>value1</value>
        <description>description of value1</description>
      </option>
      <option>
        <value>value2</value>
      </option>
    </options>
```

-continued

```
    </property>
</variantPropertiesDefinition>
```

The instance file of an actual property set is stored along with the corresponding variant. This file describes the position of the actual variant in the mapping space belonging to its seed component, and therefore contains the coordinates of the seed component. The identity of the used variant coordinate system can be found from the coordinates of the seed component. Additionally, the variant metadata includes the actual values of the dimensions (of the used variant coordinate system) used to determine the actual coordinates in the common repository and to store the variant build results. The instance file may contain the following three kinds of properties:

| Property | Meaning |
|---|---|
| | Seed Component |
| seed.groupid | The group id of the seed component version |
| seed.artifactid | The artifact id of the seed component version. The version is identical to the version of the actual variant. |
| | Coordinate System |
| dimension.<name> ... | Meaning according to definition in coordinate system |
| | Variant Properties according to Coordinate System |
| <property name> ... | Meaning according to definition in coordinate system |

Figure 4:
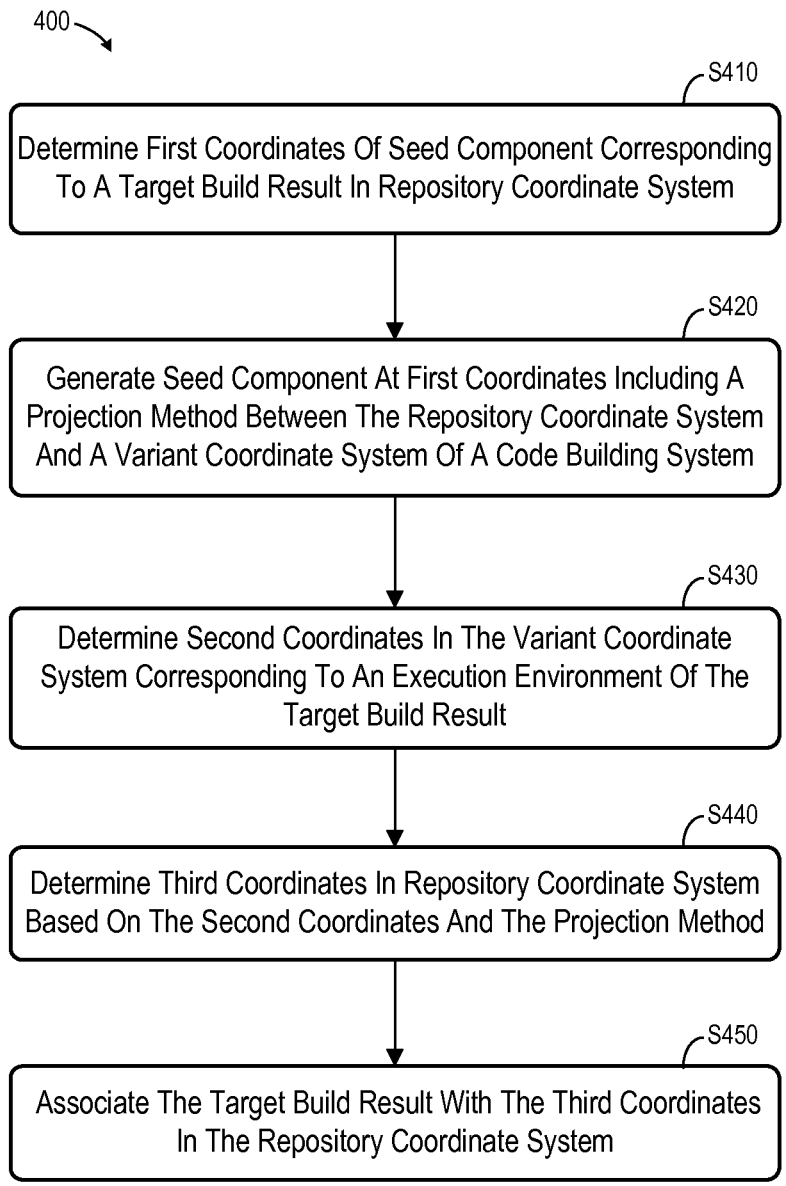
FIG. 4 is a flow diagram according to some embodiments.

FIG. 4 is a flow diagram of process 400 according to some embodiments. Process 400 and each other process described herein may be embodied in processor-executable program code read from one or more non-transitory computer-readable media, such as a floppy disk, a CD-ROM, a DVD-ROM, a Flash drive, a fixed disk and a magnetic tape, and then stored in a compressed, uncompiled and/or encrypted format. Accordingly, a processor of any suitable device or devices (e.g., repository management system 110) may execute the program code to cause the device or devices to operate as described. In some embodiments, hard-wired circuitry may be used in place of, or in combination with, program code for implementation of processes according to some embodiments. Embodiments are therefore not limited to any specific combination of hardware and software.

Process 400 may be performed to store a build result in a common repository, where the build system which generated the build result features a variant coordinate system and produces multiple build result variants for every source component version.

Prior to process 400, it will be assumed that a code building system has generated a target build result corresponding to a source component based on specified build parameters and/or execution environment parameters which are expressed as dimension values of a variant coordinate system of the code building system. Moreover, it will be assumed that the code building system has transmitted a request (e.g., to build result management tool 230) to store the target build result in the common repository.

At S410, first coordinates of a seed component in the repository coordinate system are determined. The seed component corresponds to the target build result.

Figure 5:
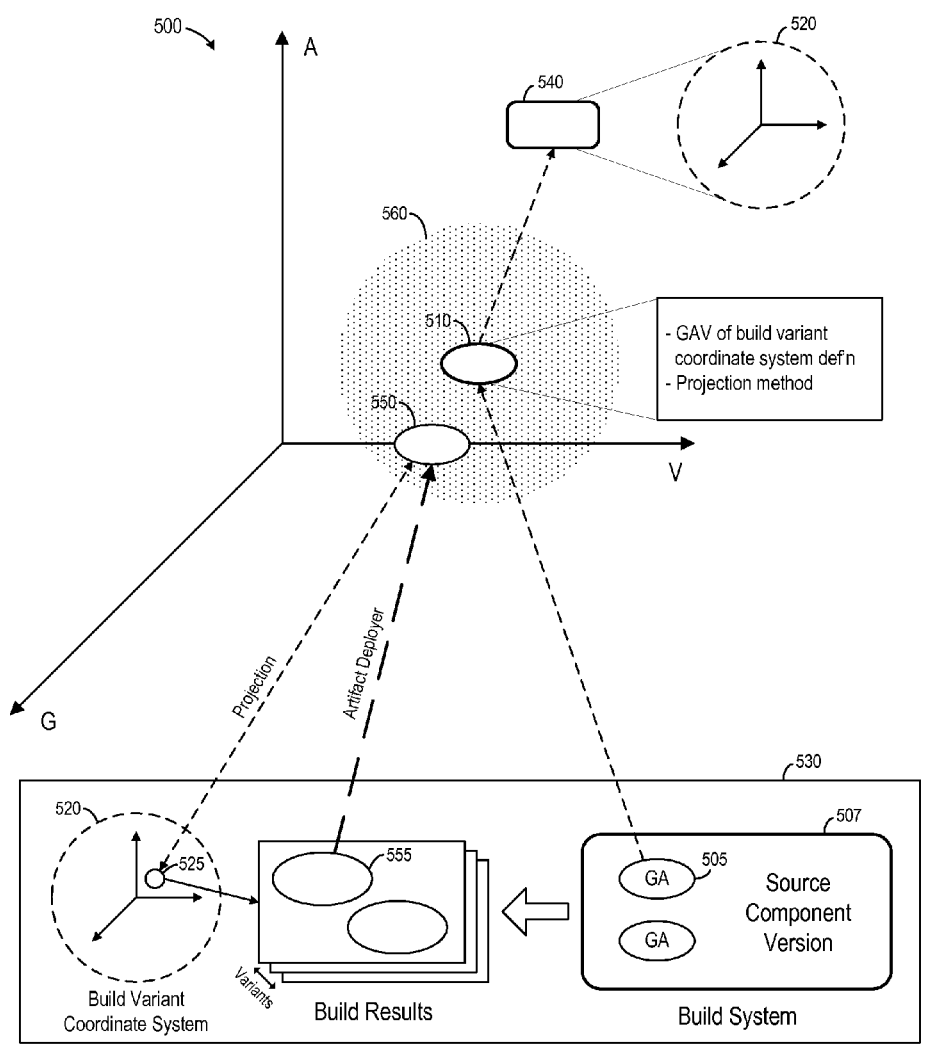
FIG. 5 illustrates storage of a build result in a common repository according to some embodiments.

The seed component coordinates are identical to the coordinates of result component 505 described by source component version 507 (i.e., directly maintained by the developer) as shown in FIG. 5. According to some embodiments, and as illustrated in FIG. 5, the coordinates of seed component 510 in repository coordinate system 500 are transmitted along with the request to store the target build result in the common repository.

Assuming that no seed component exists at these coordinates (i.e., the target build result is the first build variant generated for the particular source component version), a seed component is generated at S420. Seed component 510 includes a projection method between repository coordinate system 500 and build variant coordinate system 520 of build system 530. Seed component 510 also includes coordinates, conforming to repository coordinate system 500, of component 540, which includes a definition of variant coordinate system 520 as described with respect to FIG. 3.

If the seed component exists at S420, the actual settings (i.e. projection method and variant coordinate system 520) are validated against the already-found seed component settings. If the settings match, it is assured that all variants for a dedicated seed/build result component version are using the same settings. It is possible that different component versions may use different settings, but a particular version is to use consistent settings.

Next, at S430, second coordinates are determined in the variant coordinate system which correspond to the execution environment and/or build mode of the target build result. As mentioned above, these coordinates may be transmitted by build system 530 along with the request to store the target build result. These coordinates do not require any special mapping at S430, because they conform to the variant coordinate system (e.g., system 520) of the build system which was used to generate the target build result. However, the coordinates may be validated against the used variant coordinate system by confirming whether the coordinates include values for all dimensions defined in the used variant coordinate system version, and whether the values are valid for those dimensions according to the dimension definitions found in the variant coordinate system definition. FIG. 5 illustrates point 525 of coordinate system 520 specified by the second coordinates.

Third coordinates of the repository coordinate system are determined based on the second coordinates at S440. Since seed component 510 specifies a projection method between repository coordinate system 500 and build variant coordinate system 520, the projection method is applied to the second coordinates (which conform to variant coordinate system 520) together with the seed component coordinates (which conform to repository coordinate system 500) to determine third coordinates 550 corresponding to repository coordinate system 500.

The target build result is then stored in the repository, in association with the determined third coordinates, at S450. FIG. 5 further illustrates the projection between point 525 of coordinate system 520 and a point of repository coordinate system 500 specified by the third coordinates 550, as well as the association of target build result 555 with this point of repository coordinate system 500.

Process 400 may be repeated for another result component described by another source component version, which would result in generation of a second seed component and storage of a second target build result as described above. Moreover, the execution environment of the second target build result may differ from the execution environment of the example above.

More particularly, repeating process 400 in this manner would include determination of fourth coordinates in the repository coordinate system associated with a second seed component corresponding to a second target build result of the first code building system. This second seed component would include a second projection method between the repository coordinate system and the variant coordinate system of the first code building system.

Next, fifth coordinates in the variant coordinate system are determined, where the fifth coordinates are associated with a second execution environment of the second target build result. Sixth coordinates in the repository coordinate system are then determined as described above based on the fourth coordinates, the fifth coordinates and the second projection method. Finally, the second target build result is associated with the sixth coordinates.

Process 400 may be repeated similarly to the primary example described above, but for a second target build result which was generated using the same build system and source component, and based on different dimension values of variant coordinate system 520. Such a process would determine the same seed component coordinates, but the second coordinates and projected third coordinates would differ, resulting in another artifact deployed within the shaded mapping space 560 around seed component 510.

Specifically, repeating process 400 in this manner would include determination of the first coordinates in the repository coordinate system which are associated with the first seed component, where the seed component also corresponds to the second target build result of the first code building system. Fourth coordinates associated with a second execution environment of the second target build result are then determined and fifth coordinates are determined in the repository coordinate system based on the fourth coordinates and the second projection method. Next, the second target build result is associated with the fifth coordinates.

Process 400 may also or alternatively be repeated similarly to the primary example described above, but for a second target build result which was generated using a second build system and source component. For example, after execution of process 400 as described above, fourth coordinates are determined in the repository coordinate system, which are associated with a second seed component corresponding to a second target build result of a second code building system, and where the second seed component comprising a second projection method between the repository coordinate system and a second variant coordinate system of the second code building system.

Next, fifth coordinates are determined in the second variant coordinate system, where the fifth coordinates are associated with a second execution environment of the second target build result, sixth coordinates are determined in the repository coordinate system based on the fourth coordinates, the fifth coordinates and the second projection method, and the second target build result is associated with the sixth coordinates.

The target build result may alternatively be generated using the same build system but a different source component. This alternative would determine a second seed component specifying the same projection method and coordinate system definition as in the original example. The seed component coordinates are part of the sources, and different source components should provide different seed component coordinates because they typically provide different result components.

A single source component version may also provide multiple build results. The source component version describes multiple seed component coordinates and a mapping of build results to those coordinates. The process 400 is repeated for every result component.

Due to the projection method, mapping space 560 may overlap with other mapping spaces associated with different seed components. Overlap may be avoided by designing the projection methods and establishing naming conventions or the seed components (e.g., forbidding special characters used to separate dimension values from seed component coordinate values).

Moreover, process 400 may be executed to store a target build result generated by a different code building system based on another source component. This process would create a new seed component specifying a new projection method (i.e., between the variant coordinate system of the different code building system and the repository coordinate system) and the coordinates (in the repository coordinate system) of a new coordinate system definition.

The seed component identities must be unique over all build systems. Different source components should not use the same result component identities, either in the same build system or in different build systems. The projection methods may be designed such that the projection spaces used by different build systems do not overlap, because the seed component identities are unique.

Figure 6A:
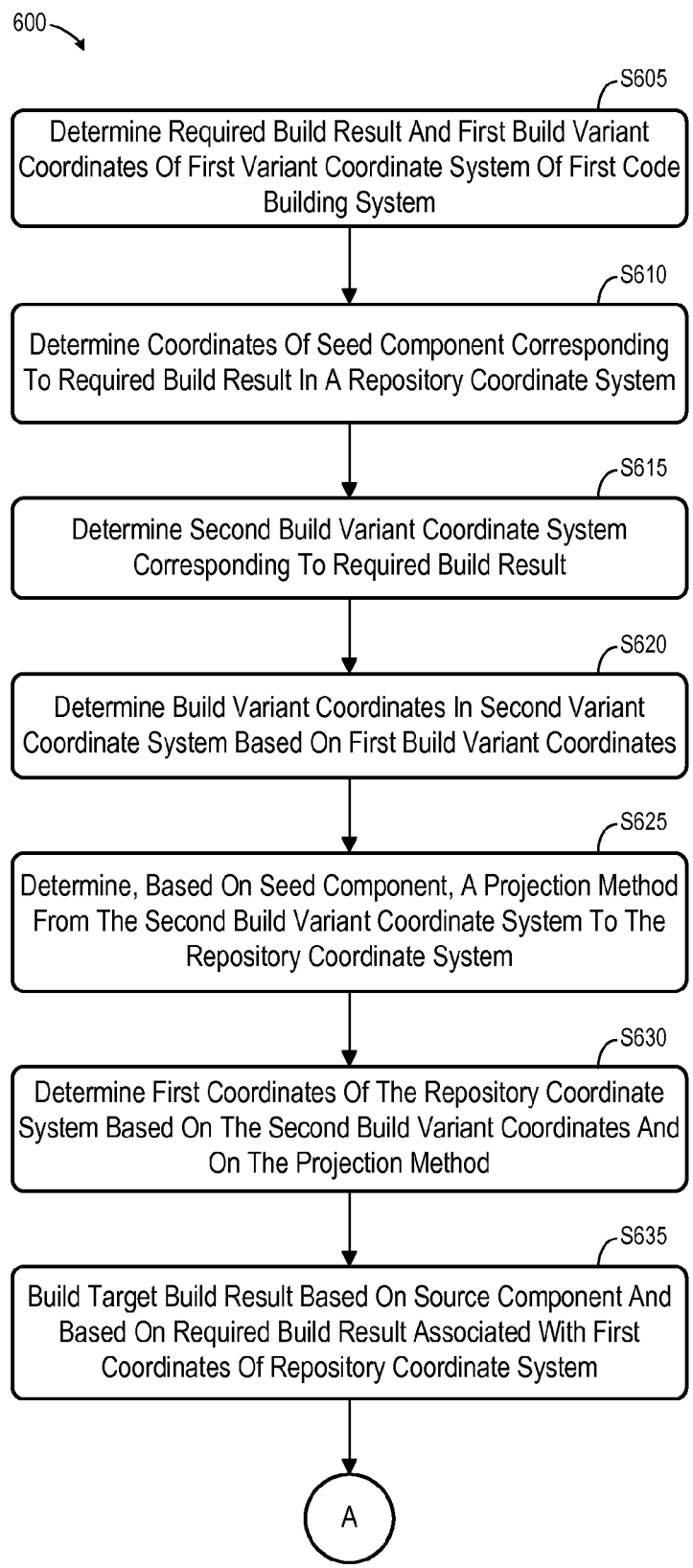
FIGS. 6A and 6B comprise a flow diagram according to some embodiments.
Figure 6B:
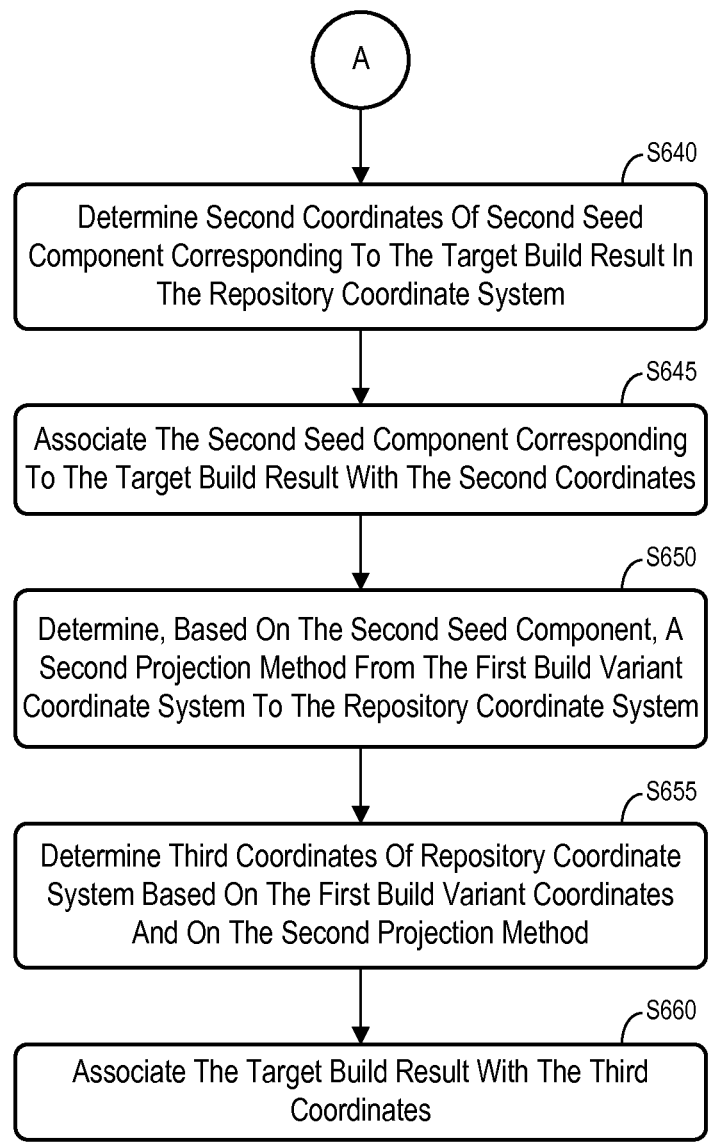

Process 600 of FIG. 6 describes the retrieval of a required build result from a repository, and the storage in the repository of a target build result created based on the required build result according to some embodiments. Process 600 may be implemented by build result management tool 230 according to some embodiments.

Figure 7:
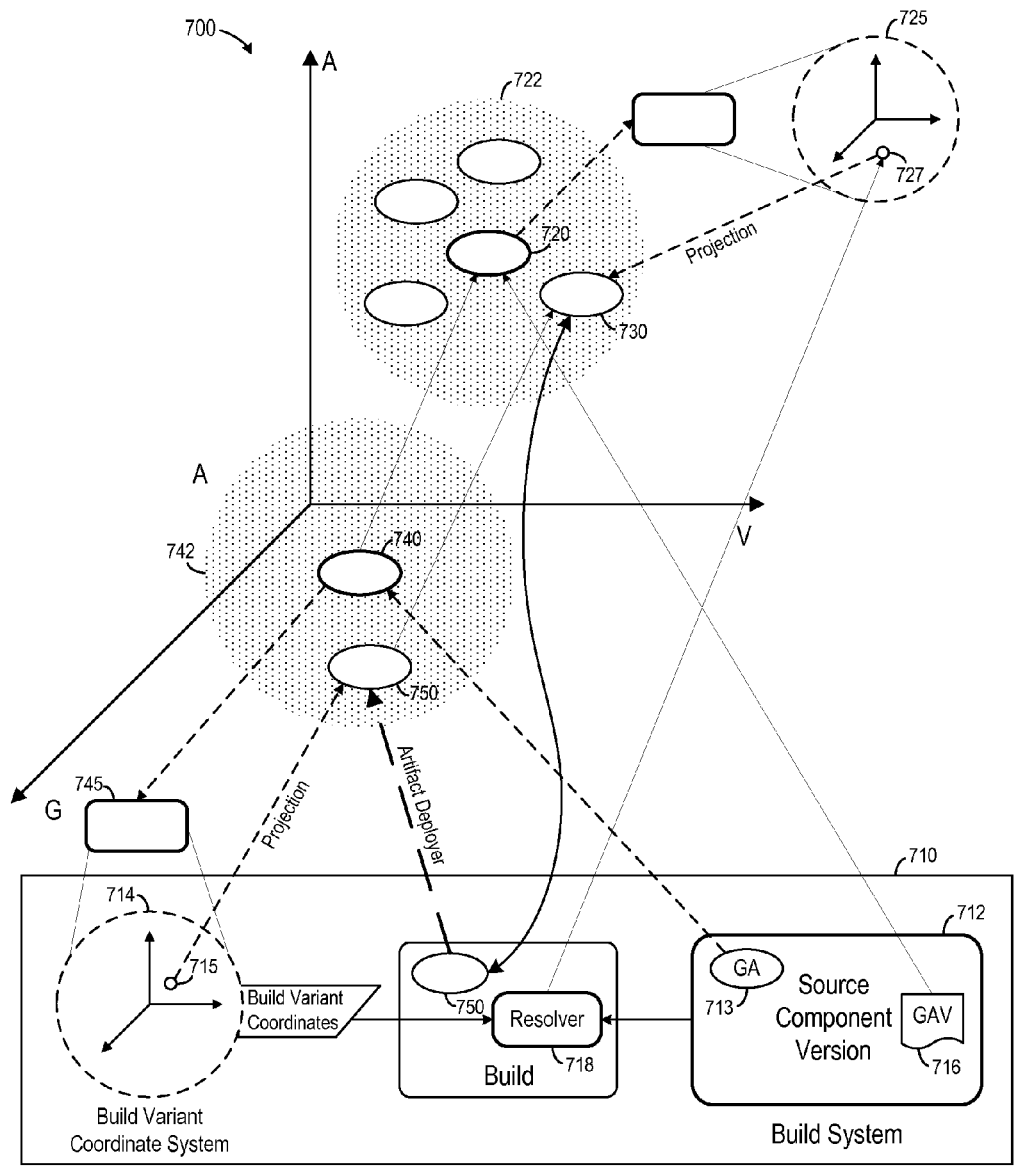
FIG. 7 illustrates identification and usage of a build result stored in a common repository according to some embodiments.

FIG. 7 illustrates process 600 according to some embodiments. Build system 710 intends to build a target build result based on source component 712. A build mode and/or execution environment of the target build result is specified by first build variant coordinates of build variant coordinate system 714. Moreover, in order to build the target build result, build system 710 requires a build result specified in dependency declaration 716. The required build result is a previously-generated build result that is needed to generate the target build result.

Build system 710 may therefore pass a request for the required build result to build result management tool 230. The request includes dependency declaration 716, which specifies the group ID, artifact ID (and version) coordinates of the required build result in repository coordinate system 700. The request also includes first build variant coordinates of build variant coordinate system 714.

Therefore, at S605, a required build result is determined. Also determined at S605 are the first build variant coordinates (i.e., coordinates 715) of a first variant coordinate system (i.e., coordinate system 714) of a first code building system (i.e., system 710). As mentioned above, the required build result may be determined from the received dependency declaration 716 extended by the actual variant coordinates 715. This information is then mapped to repository coordinates 730 of the repository coordinate system 700 of an existing build result variant that is applicable to resolve the dependency.

Coordinates of a seed component corresponding to the required build result are determined at S610. The seed component coordinates may be determined directly from the dependency declaration and conform to repository coordinate system 700. FIG. 7 illustrates seed component 720 located at the determined coordinates.

Next, at S615, a second build variant coordinate system corresponding to the required build result is determined. The second build variant coordinate system may be determined based on seed component 720, which provides coordinates of a definition of second build variant coordinate system 725 and a projection method between repository coordinate system 700 and coordinate system 725.

Build variant coordinates in the second variant coordinate system (i.e., coordinate system 725) are determined based on the first variant coordinates of build variant coordinate system 714 at S620. If coordinate system 714 is identical to coordinate system 725 of the requested result component, the mapping of the variant coordinates is trivial. If the coordinate systems are different (e.g., the required build result was built by a code building system different from build system 710), coordinates in build variant coordinate system 725 are determined which correspond to the first variant coordinates of build variant coordinate system 714 specified in S605, in order to locate the appropriate build variant of seed component 720.

Determination of the build variant coordinates in the second variant coordinate system at S620 may proceed in many different manners according to some embodiments. In some embodiments, resolver 718 uses a special extendable mapping library to access definitions of coordinate systems 714 and 725 and apply mapping rules such as "dimension) of system) maps to dimension2 of system2".

In some embodiments, resolver 718 identifies coordinate system 725 based on seed component 720 and uses its projection method to address and browse shaded variant space 722 of the component version in the repository. During such browsing, resolver 718 may compare the variant properties described above for each build variant in the variant space with variant properties specified in addition to the first variant coordinates by build system 710.

Resolver 718 may determine an ordered list of resolution possibilities in the local coordinate system 714 for every dependency based on the fallbacks, generalizations and compatibilities specified by the variant coordinate system definition. The fallbacks, generalizations and compatibilities describe which coordinates can substitute for one another to achieve a valid build result. The ordered list is then mapped according to a dedicated mapping procedure to the target variant coordinate system 725.

Next, for each entry in the ordered list, the above mechanism for evaluating the alternatives, generalizations and fallbacks is again executed, but according to the target variant coordinate system definition 725. The result is a list of resolved variant alternatives in the variant coordinate system 725 of the dependency 716.

These ordered lists (i.e., the list of coordinates in system 714, the mapping and the target list in system 725, and the expanded list in system 725) are independent of the concrete seed component coordinates. The lists only depend on the involved variant coordinate systems (which depends on the content of seed component 720 described by dependency 716), and can therefore be calculated once for all occurring variant coordinate systems found for dependencies 716.

Resolver 718 then checks, for every resulting possibility, for the existence of a result variant in the repository according to the listed order. The projection method specified by seed component 720 described by dependency 716 is determined at S625. The list of variant coordinates is mapped to a list of coordinates of repository coordinate system 700 by applying the projection method at S630 to all variant coordinates in the list together with the coordinates of the seed component. The result is a list of repository coordinates in the shaded resolution space 722 of seed component 720. These are the repository coordinates of potentially applicable variants associated with seed component 720.

The first entry 730 in this list for which a build result is found in repository 700 is chosen to resolve the requested dependency.

Since build result 730 is associated with these coordinates of repository coordinate system 700, build result 730 is returned to build system 710 and build system 710 builds target build result 755 at S635 using build result 730 and based on the build mode and/or execution environment specified by the aforementioned first variant coordinates of coordinate system 714. With reference to architecture 200 and unlike the other steps of process 600, S635 would be performed by an entity other than build result management tool 230.

The remainder of process 600 proceeds similarly to process 400 to store build result 755 as variant component 750 in the common repository. More specifically, code building system 710 may transmit a request (e.g., to build result management tool 230) to store build result 755 in the common repository. The request includes the group ID, artifact ID and the source component version of source component 712, and these coordinates are determined at S640 to be coordinates 740 of a seed component corresponding to target build result 750.

A seed component 740 corresponding to target build result 750 is generated and associated with these coordinates at S645. The second seed component 740 includes coordinates, conforming to repository coordinate system 700, of component 745 including a definition of variant coordinate system 714. Seed component 740 also includes a projection method between repository coordinate system 700 and build variant coordinate system 714 of build system 710.

The projection method is determined from seed component 740 at S650 and is used at S655 to determine third coordinates 750 in shaded variant space 742 of repository coordinate system 700 based on the first variant coordinates 715 of target build result 755 and the coordinates of seed component 740 in repository coordinate system 700. These first variant coordinates of target build result 750 may have been received with the request to store target build result 755 or may have been cached since being received at S605.

The target build result is then stored in the repository at S660, in association with the determined third coordinates. FIG. 7 illustrates the projection between point 715 of coordinate system 714 and a point of repository coordinate system 700 specified by the third coordinates 750, as well as the association of target build result 755 with the point of repository coordinate system 700.

Figure 8:
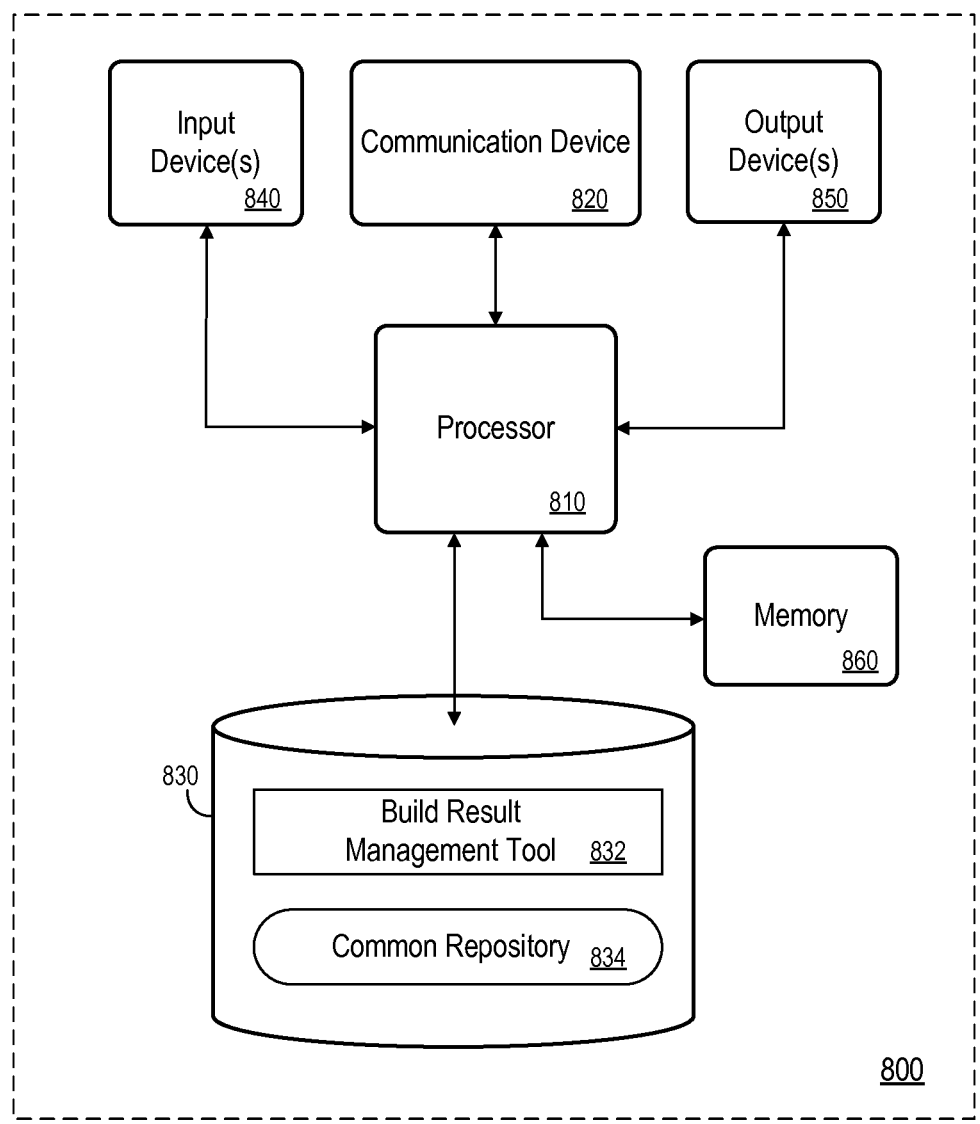
FIG. 8 is a block diagram of a hardware system according to some embodiments.

FIG. 8 is a block diagram of apparatus 800 according to some embodiments. Apparatus 800 illustrates a hardware architecture implementing a common repository and build result management tool as described above, but implementations are not limited thereto. Elements of apparatus 800 may therefore operate to execute methods as described above. Apparatus 800 may include other unshown elements according to some embodiments.

Apparatus 800 includes processor 810 operatively coupled to communication device 820, data storage device 830, one or more input devices 840, one or more output devices 850 and memory 860. Communication device 820 may facilitate communication with external computing systems, such as via a computer network. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into apparatus 800. Output device(s) 850 may comprise, for example, a display (e.g., a display screen) a speaker, and/or a printer.

Data storage device 830 may comprise any appropriate persistent non-transitory storage media, including combinations of magnetic storage devices (e.g., magnetic tape, hard disk drives and flash memory), optical storage devices, Read Only Memory (ROM) devices, etc., while memory 860 may comprise Random Access Memory (RAM).

Build result management tool 832 of data storage device 830 may comprise program code executable by processor 810 to provide any of the functions described herein, including but not limited to processes 400 and 600. Embodiments are not limited to execution of these functions by a single apparatus. Data storage device 830 may also store data and other program code for providing additional functionality and/or which are necessary for operation thereof, such as device drivers, operating system files, etc.

Common repository 834 may include any of the data structures described above with respect to a common repository, but embodiments are not limited thereto. Common repository 834 may be stored one or more storage devices other than or including data storage device 830. Such one or more storage devices may be managed by a data management system (not shown).

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A method implemented by a computing system in response to execution of program code by a processor of the computing system, the method comprising:
    determining first coordinates in a repository coordinate system of a repository, the first coordinates associated with a seed component corresponding to a target build result of a first code building system, the seed component comprising a projection method between the repository coordinate system and a variant coordinate system of the first code building system, and the projection method to generate sub-space coordinates of the repository coordinate system within a respective sub-space of a given seed component based on given coordinates of the given seed component and input coordinates of the variant coordinate system;
    determining second coordinates in the variant coordinate system, the second coordinates associated with an execution environment of the target build result;
    converting the second coordinates to third coordinates in the repository coordinate system using the projection method and using the first coordinates and the second coordinates as input to the projection method, the third coordinates residing in a sub-space associated with the seed component;
    storing the target build result in the repository in association with the third coordinates; and
    determining fourth coordinates in the repository coordinate system associated with a second seed component corresponding to a second target build result of the first code building system, the second seed component comprising a second projection method between the repository coordinate system and the variant coordinate system of the first code building system the second projection method to generate second sub-space coordinates of the repository coordinate system within a respective second sub-space of a given second seed component based on given second coordinates of the given second seed component and input coordinates of the variant coordinate system.

2. A method according to claim 1, further comprising:
    generating the seed component; and
    storing the seed component in the repository in association with the first coordinates.

3. A method according to claim 1, further comprising:
    determining fifth coordinates in the variant coordinate system, the fifth coordinates associated with a second execution environment of the second target build result;
    converting the fifth coordinates to sixth coordinates in the repository coordinate system using the second projection method and using the fourth coordinates and the fifth coordinates as input to the second projection method, the fifth coordinates residing in a second sub-space associated with the second seed component; and
    storing the second target build result in the repository in association with the sixth coordinates.

4. A method according to claim 1, further comprising:
    determining fifth coordinates in the repository coordinate system associated with a second seed component corresponding to a second target build result of a second code building system, the second seed component comprising a second projection method between the repository coordinate system and a second variant coordinate system of the second code building system, the second projection method to generate second sub-space coordinates of the repository coordinate system within a respective second sub-space of a given second seed component based on given second coordinates of the given second seed component and input coordinates of the variant coordinate system;
    determining sixth coordinates in the second variant coordinate system, the sixth coordinates associated with a second execution environment of the second target build result;
    converting the sixth coordinates to seventh coordinates in the repository coordinate system using the second projection method and using the fifth coordinates and the sixth coordinates as input to the projection method, the seventh coordinates residing in a second sub-space associated with the second seed component; and
    storing the second target build result in the repository in association with the seventh coordinates.

5. A method according to claim 1, further comprising:
    determining the first coordinates in the repository coordinate system associated with the first seed component corresponding to a second target build result of the first code building system;
    determining fifth coordinates in the variant coordinate system, the fifth coordinates associated with a second execution environment of the second target build result;
    converting the fifth coordinates to sixth coordinates in the repository coordinate system using the projection method and using the first coordinates and the fifth coordinates as input to the projection method, the sixth coordinates residing in a sub-space associated with the seed component; and
    storing the second target build result in the repository in association with the sixth coordinates.

6. A system comprising:
    a processor; and a memory storing processor-executable process steps executable by the processor to cause the system to:

determine first coordinates in a repository coordinate system of a repository, the first coordinates associated with a seed component corresponding to a target build result of a first code building system, the seed component comprising a projection method between the repository coordinate system and a variant coordinate system of the first code building system, and the projection method to generate sub-space coordinates of the repository coordinate system within a respective sub-space of a given seed component based on given coordinates of the given seed component and input coordinates of the variant coordinate system;

determine second coordinates in the variant coordinate system, the second coordinates associated with an execution environment of the target build result;

convert the second coordinates to third coordinates in the repository coordinate system using the projection method and using the first coordinates and the second coordinates as input to the projection method, the third coordinates residing in a sub-space associated with the seed component;

store the target build result in the repository in association with the third coordinates; and determine fourth coordinates in the repository coordinate system associated with a second seed component corresponding to a second target build result of the first code building system, the second seed component comprising a second projection method between the repository coordinate system and the variant coordinate system of the first code building system the second projection method to generate second sub-space coordinates of the repository coordinate system within a respective second sub-space of a given second seed component based on given second coordinates of the given second seed component and input coordinates of the variant coordinate system.

7. A system according to claim 6, the process steps further executable by the processor to cause the system to:
generate the seed component; and
store the seed component in the repository in association with the first coordinates.

8. A system according to claim 6, the process steps further executable by the processor to cause the system to:
determine fifth coordinates in the variant coordinate system, the fifth coordinates associated with a second execution environment of the second target build result;
convert the fifth coordinates to sixth coordinates in the repository coordinate system using the second projection method and using the fourth coordinates and the fifth coordinates as input to the second projection method, the fifth coordinates residing in a second sub-space associated with the second seed component; and
store the second target build result in the repository in association with the sixth coordinates.

9. A system according to claim 6, the process steps further executable by the processor to cause the system to:
determine fifth coordinates in the repository coordinate system associated with a second seed component corresponding to a second target build result of a second code building system, the second seed component comprising a second projection method between the repository coordinate system and a second variant coordinate system of the second code building system, the second projection method to generate sub-space coordinates of the repository coordinate system within a respective second sub-space of a given second seed component based on given second coordinates of the given second seed component and input coordinates of the variant coordinate system;

determine sixth coordinates in the second variant coordinate system, the sixth coordinates associated with a second execution environment of the second target build result;

convert the sixth coordinates to seventh coordinates in the repository coordinate system using the second projection method and using the fifth coordinates and the sixth coordinates as input to the projection method, the seventh coordinates residing in a second sub-space associated with the second seed component; and store the second target build result in the repository in association with the seventh coordinates.

10. A system according to claim 6, the process steps further executable by the processor to cause the system to:
determine the first coordinates in the repository coordinate system associated with the first seed component corresponding to a second target build result of the first code building system;
determine fifth coordinates in the variant coordinate system, the fifth coordinates associated with a second execution environment of the second target build result;
convert the fifth coordinates to sixth coordinates in the repository coordinate system using the second projection method, the sixth coordinates residing in a sub-space associated with the seed component; and
store the second target build result in the repository in association with the sixth coordinates.

11. A non-transitory computer-readable medium storing processor executable program code executable by a processor of a computing system to cause the computing system to:
determine first coordinates in a repository coordinate system of a repository, the first coordinates associated with a seed component corresponding to a target build result of a first code building system, the seed component comprising a projection method between the repository coordinate system and a variant coordinate system of the first code building system, and the projection method to generate sub-space coordinates of the repository coordinate system within a respective sub-space of a given seed component based on given coordinates of the given seed component and input coordinates of the variant coordinate system;

determine second coordinates in the variant coordinate system, the second coordinates associated with an execution environment of the target build result;

convert the second coordinates to third coordinates in the repository coordinate system using the projection method and using the first coordinates and the second coordinates as input to the projection method, the third coordinates residing in a sub-space associated with the seed component;

store the target build result in the repository in association with the third coordinates; and determine fourth coordinates in the repository coordinate system associated with a second seed component corresponding to a second target build result of the first code building system, the second seed component comprising a second projection method between the repository coordinate system and the variant coordinate system of the first code building system the second projection method to generate second sub-space coordinates of the repository coordinate system within a respective second sub-space of a given second seed component based on given second coordinates of the given second seed component and input coordinates of the variant coordinate system.

12. A medium according to claim 11, the process steps further executable by the processor to cause the system to:
generate the seed component; and
store the seed component in the repository in association with the first coordinates.

13. A medium according to claim 11, the process steps further executable by the processor to cause the system to:
determine fifth coordinates in the variant coordinate system, the fifth coordinates associated with a second execution environment of the second target build result;
convert the fifth coordinates to sixth coordinates in the repository coordinate system using the second projection method and using the fourth coordinates and the fifth coordinates as input to the second projection method, the fifth coordinates residing in a second sub-space associated with the second seed component; and
store the second target build result in the repository in association with the sixth coordinates.

14. A medium according to claim 11, the process steps further executable by the processor to cause the system to:
determine fifth coordinates in the repository coordinate system associated with a second seed component corresponding to a second target build result of a second code building system, the second seed component comprising a second projection method between the repository coordinate system and a second variant coordinate system of the second code building system, the second projection method to generate second sub-space coordinates of the repository coordinate system within a respective second sub-space of a given second seed component based on given second coordinates of the given second seed component and input coordinates of the variant coordinate system;
determine sixth coordinates in the second variant coordinate system, the sixth coordinates associated with a second execution environment of the second target build result;
convert the sixth coordinates to seventh coordinates in the repository coordinate system using the second projection method and using the fifth coordinates and the sixth coordinates as input to the projection method, the seventh coordinates residing in a second sub-space associated with the second seed component; and
store the second target build result in the repository in association with the seventh coordinates.

15. A medium according to claim 11, the process steps further executable by the processor to cause the system to:
determine the first coordinates in the repository coordinate system associated with the first seed component corresponding to a second target build result of the first code building system;
determine fifth coordinates in the variant coordinate system, the fourth coordinates associated with a second execution environment of the second target build result;
convert the fifth coordinates to sixth coordinates in the repository coordinate system using the second projection method and using the first coordinates and the fifth coordinates as input to the projection method, the sixth coordinates residing in a sub-space associated with the seed component; and
store the second target build result in the repository in association with the sixth coordinates.

* * * * *